United States Patent [19]

Ikefuji

[11] Patent Number: 5,042,066
[45] Date of Patent: Aug. 20, 1991

[54] DIALER CIRCUIT
[75] Inventor: Yoshihiro Ikefuji, Kyoto, Japan
[73] Assignee: Rohm Co., Ltd., Japan
[21] Appl. No.: 430,333
[22] Filed: Nov. 2, 1989
[30] Foreign Application Priority Data
  Nov. 8, 1988 [JP] Japan .................................. 63-281824
[51] Int. Cl.$^5$ .............................................. H04M 1/00
[52] U.S. Cl. ..................................... 379/413; 379/360; 379/361; 379/362; 379/387
[58] Field of Search ................ 379/339, 355, 360, 361, 379/362, 387, 413

[56] References Cited

U.S. PATENT DOCUMENTS

| | | |
|---|---|---|
| 4,419,542 | 12/1983 | Embree et al. . |
| 4,475,013 | 10/1984 | Lee et al. . |
| 4,476,350 | 10/1984 | Aull et al. . |
| 4,560,841 | 12/1985 | Pierrel . |
| 4,581,487 | 4/1986 | Cochran . |
| 4,612,417 | 9/1986 | Toumani . |
| 4,653,088 | 3/1987 | Budd et al. . |
| 4,665,547 | 5/1987 | Tuhy, Jr. . |
| 4,727,574 | 2/1988 | Jakab . |
| 4,811,391 | 3/1989 | Van Dongen et al. . |
| 4,961,220 | 10/1990 | Tentler et al. ........................ 379/413 |

Primary Examiner—Jin F. Ng
Assistant Examiner—Jhancy Augustus
Attorney, Agent, or Firm—Oliff & Berridge

[57] ABSTRACT

A dialer circuit equipped with built-in dialer memories for auto-redial or abbreviated-dial telephone communication and operable to send out a DTMF signal or a pulse signal to a telephone circuit based on a key input signal. A battery voltage is supplied to the dialer memories from a back-up battery, while a supply voltage is supplied to the other function circuits from a telephone circuit line. A voltage level converter means is located between the dialer memories and the other function circuits and eliminates production of through current resulting from the difference between the back-up battery voltage and the line voltage.

11 Claims, 8 Drawing Sheets

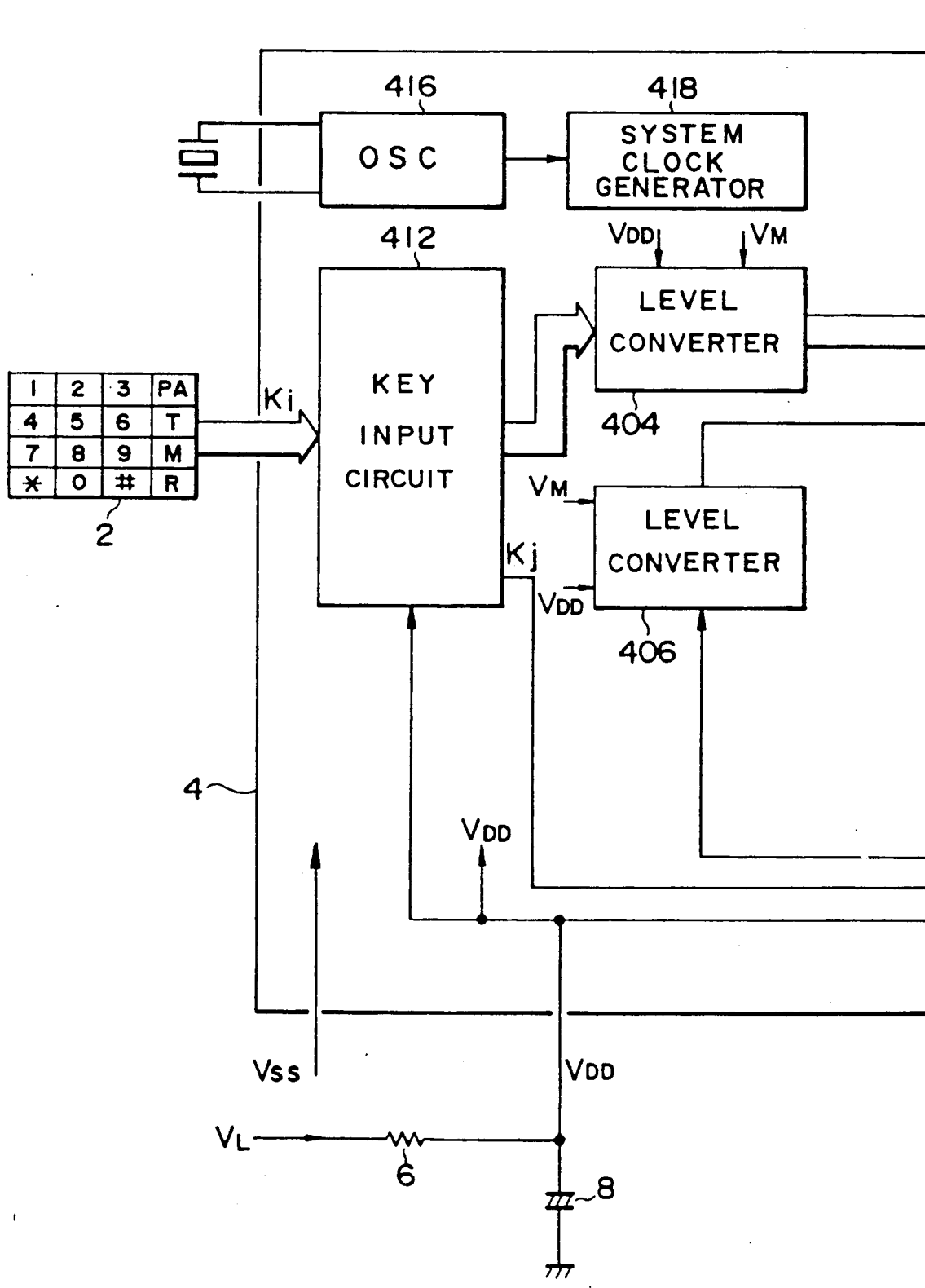

DIALER CIRCUIT

BACKGROUND OF THE INVENTION

1. Field of the Invention

This invention relates to a dialer circuit, and more particularly to the improvement to a dialer circuit including a dialer memory for sending out a dialer output signal to a telephone circuit line based on an input signal and also for storing therein at least part of the dialer output signal. In the dialer circuit, a supply voltage taken from a telephone circuit line is supplied to a dialer function circuit, and a supply of power to the dialer memory is taken effect from a memory back-up power source.

2. Description of the Related Art

Heretofore, in IC telephones in which various component parts of the individual circuit are integrated on a single chip, a dialer memory is mounted in a dialer which issues a dialer output signal upon receipt of a key input from a keyboard. In this dialer memory, various dialer signals such as a program, read-only data, etc. are stored. Accordingly a memory back-up battery is built in a circuit board to back up the memory in an effort to prevent the data from disappearing.

FIG. 6 of the accompanying drawings shows the general structure of a typical conventional dialer circuit in an IC form. As shown in FIG. 6, a keyboard 2 as an external circuit is connected to a dialer 4 where, in the tone output mode, a DTMF (Dual Tone Multi-Frequency) signal is outputted based on a key input signal $K_i$ given by depressing one of keys on the keyboard 2, and in the pulse output mode, a pulse signal corresponding to the key input is outputted to a telephone circuit line. In order to send out such a dialer output signal, the dialer 4 is equipped with a redial memory 401 and a repertory memory 402, as a dialer memory for storing dial data. Also in the dialer 4, a key input circuit 412, a system control circuit 414, an oscillator 416, a system clock generator circuit 418, an output control circuit 420, a DTMF output circuit 422, and a pulse output circuit 424 are integrated on one and the same semiconductor chip.

To the redial memory 401, repertory memory 402 and other dialer function circuits in the dialer 4, a supply voltage $V_L$ supplied via the telephone circuit line is supplied, as $V_{DD}$, via a resistor 6, diode 7 and a capacitor 8. Further, in order to prevent the data in the redial memory 401 and the repertory memory 402 from disappearing, the dialer 4 is equipped with a battery 10 as a memory back-up power source. This battery 10 also is connected to the redial memory 401, the repertory memory 402 and other function circuits via a resistor 12 and a diode 13 in parallel to the line voltage $V_L$.

However, in this conventional dialer circuit, as shown in FIG. 6, since the battery 10 is directly connected to the supply line of the supply voltage $V_{DD}$ given by the telephone circuit line voltage $V_L$, an operating current flowing to the dialer circuit would be supplied from the battery 10 when the circuit voltage $V_L$ becomes lower than a voltage $V_M$ of the battery 10 (i.e., $V_M > V_L$). Thus the battery 10, which is incorporated originally for the purpose of backing up the memory, would play here as a compensation power source to meet with the lowering of the circuit voltage $V_L$. Consequently as the circuit voltage $V_L$ is blocked, the battery 10 would take a much amount of waste, thus resulting in a shortened span of life.

SUMMARY OF THE INVENTION

It is therefore an object of this invention to provide a dialer circuit in which an operating current is prevented from flowing from a battery to various function circuits even when a telephone circuit line voltage is lowered, thus avoiding any wasteful consumption of the battery.

According to this invention, there is provided a dialer circuit for sending out a predetermined dialer signal to a telephone circuit line based on a key input signal, comprising: a plurality of dialer function circuits for giving a predetermined conversion to the key input signal and for outputting the resulting key input signal, as a dialer signal in the form of either a DTMF signal or a pulse signal, to the telephone circuit line; a dialer memory for storing the dialer signal so that the stored dialer signal may be optionally read by the dialer function circuits; a line power source circuit for supplying a line voltage of the telephone circuit line, as a supply voltage, to the dialer function circuits; a memory back-up battery separate from and independent of the line power source circuit for supplying a supply voltage to the dialer memory; and a voltage level converter circuit disposed between the dialer memory and each of the dialer function circuits for matching a differential voltage level between the memory back-up battery and the line power source circuit.

With this arrangement, since the respective power source systems for the dialer memory and the other function circuits are separate from and independent of each other, it is possible to prevent the operating current with respect to the other function circuits from flowing from a battery connected to the dialer memory.

Specifically, because the power source for the dialer memory and the other function circuits are divided into two separate systems, voltages are impressed to the memory and the other function circuits by a back-up battery and a telephone circuit line voltage $V_L$, respectively. However, with such separated power sources, when the circuit voltage varies, it would be impossible to have the circuit voltage in conformity with the voltage of the battery connected to the memory. Leaving this non-conformity in voltage causes a fear that transfer of data between the memory and the other function circuits can be carried out imperfectly.

In particular, if the telephone circuit line voltage and the battery voltage are remarkably out of coincidence with each other, a through current flows to the dialer function circuits or the dialer memory circuit interconnected directly circuit wise, whichever circuit located backwardly, thus causing a much amount of current consumption.

This will now be described more with reference to FIG. 7, which shows a typical conventional circuit. In FIG. 7, a dialer function circuit 60 and a dialer memory circuit 62 are directly interconnected and are energized by a line voltage $V_{DD}$ and a battery voltage $V_M$, respectively.

Each of these two circuits 60 (or 62) includes a pair of FETs (Field-Effect Transistor) 60a, 60b (or 62a, 62b) having opposite polarities and interconnected in series.

A signal D is supplied to a common input gate of the two FETs 60a, 60b of the dialer function circuit 60, and the output of the function circuit 60 is connected to a common input gate of the two FETs 62a, 62b of the memory circuit 62.

Therefore, when the line voltage $V_{DD}$ and the battery voltage $V_M$ are equal, both the function and memory circuits 60, 62 work with no problems; but, when the line voltage $V_{DD}$ is lowered below the battery voltage $V_M$, a through current i flows through the two FETs 62a, 62b of the memory circuit 62 if the input signal D is 0 (zero).

That is, when the input signal D is 0 volt, an input voltage $V_B$ of the memory 62 becomes equal to the line voltage $V_{DD}$ so that the through current i flows through the memory circuit 62 due to the change of $V_B = V_{DD}$, as shown in FIG. 8.

As is apparent from FIG. 8, this through current i is maximal when $V_B = V_{DD}$ reaches $\frac{1}{2}V_M$, ranging between $V_{THN}$ and $V_{THP}$.

To this end, in order to conduct the transfer of data between the memory and function circuits different in supply voltage, the dialer circuit of this invention is equipped with a level converter means for matching a differential supply voltage between the memory and function circuits. Consequently as a conversion is made to a level corresponding to a respective one of the supply voltages, it is possible to transfer data between the memory circuit and the other function circuits, irrespective of the difference between the supply voltages.

The above and other advantages, features and additional objects of this invention will be manifest to those versed in the art upon making reference to the following detailed description and the accompanying drawings in which a structural embodiment incorporating the principles of this invention is shown by way of illustrative example.

BRIEF DESCRIPTION OF THE DRAWINGS

FIG. 1A and 1B are a block diagram of a dialer circuit embodying this invention;

DETAILED DESCRIPTION

Figure 1B:
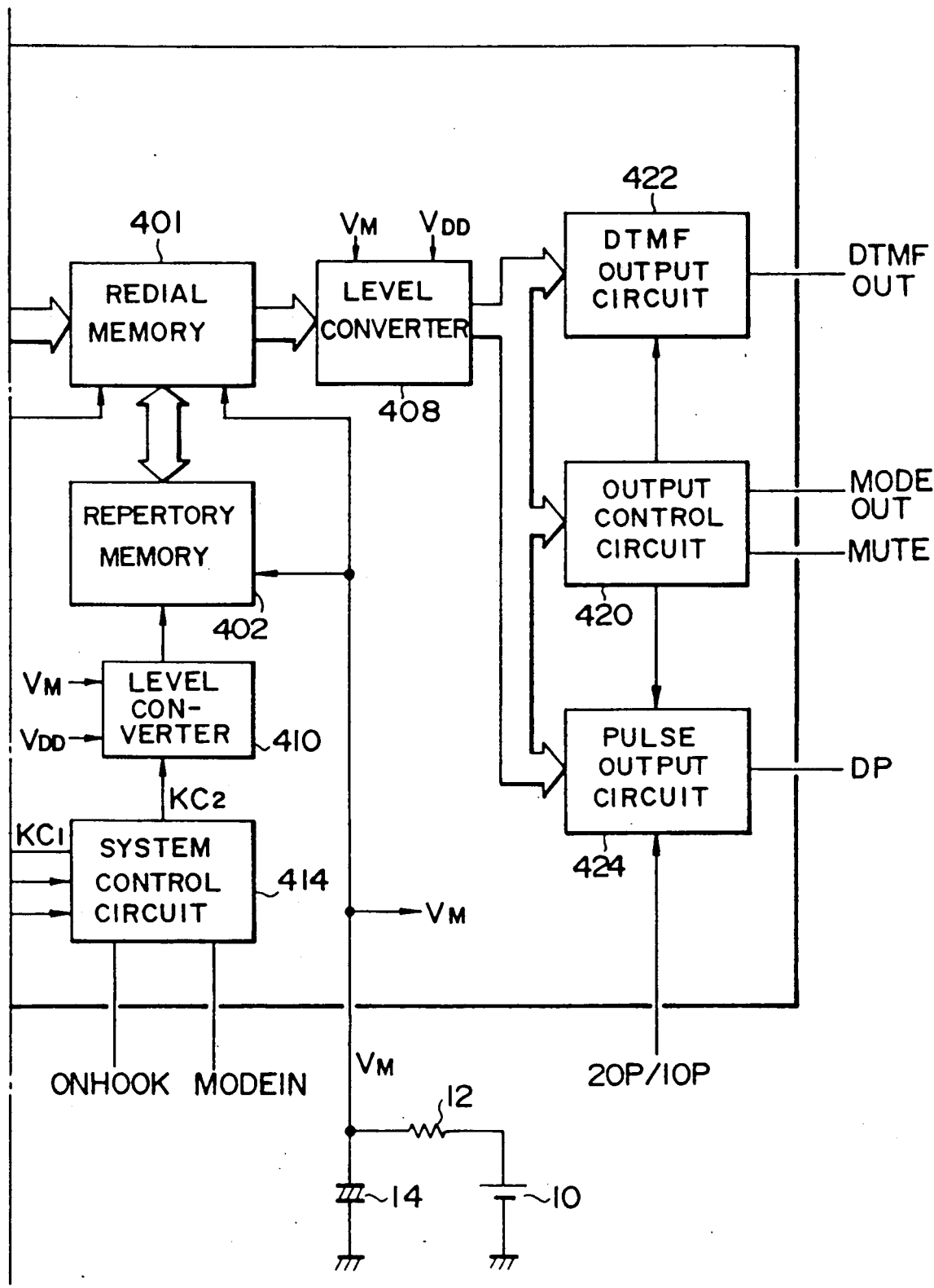

The principles of this invention are particularly useful when embodied in a dialer circuit such as shown in FIG. 1.

In FIG. 1, designated by the numeral 4 is a dialer for producing a DTMF signal or a pulse signal, as a dialer output signal, based on a key input from a keyboard 2. The dialer 4 may be in the form of an integrated circuit manufactured on a single chip of semiconductor. The dialer 4 includes a redial memory 401 and a repertory memory 402, as a memory for storing dial data. Apart from this memory, the dialer 4 also includes various function circuits, i.e., a key input circuit 412, a system control circuit 414, an oscillator 416, a system clock generator circuit 418, an output control circuit 420, a DTMF output circuit 422 and a pulse output circuit 424, all of the circuits being integrated on one and the same semi-conductor chip.

As a supply voltage $V_{DD}$ of the functional circuits such as the key input circuit 412, a circuit voltage $V_L$ from a telephone circuit line is impressed to the functional circuits via a resistor 6 and a capacitor 8, which jointly serve as a filter. Further, a back-up battery 10 is connected to the dialer 4 as the power source with respect to the redial memory 401 and the repertory memory 402. From the battery 10 a proper battery voltage $V_M$ is impressed to the redial memory 401 and the repertory memory 402 via a filter disposed exteriorly of the dialer 4 and composed of a resistor 12 and a capacitor 14.

For a significant feature of this invention, the memory system and the function circuit system are separated from one another, and in order to eliminate the inconveniences due to the use of the separate and independent power sources, a level converter means for compensating the transfer of data with respect to the signal line between the memory system and the function circuit system due to a differential battery voltage $V_M$ between the circuit voltage $V_L$ and the battery 10. This level converter means is composed of first, second, third and fourth level converters 404, 406, 408 410, to each of which both the supply voltage $V_{DD}$ due to the circuit voltage $V_L$, and the battery voltage $V_M$ are impressed.

When a handset is in an off-hook position, e.g., it is removed from a telephone body, the system control circuit 414 assumes the dial input mode as an on-hook signal (ONHOOK) with respect to the system control circuit 414 is released. Now when a key of the keyboard 2 is depressed, a key input signal $K_i$ indicating the selected key is given to the key input circuit 412 of the dialer 4, and this key input signal $K_i$ is sequentially processed in the key input circuit 412 and is given to the redial memory 401 via the level converter 404. Thus a signal, which represents the dial data obtained from the key input circuit 412 energized by the supply voltage $V_{DD}$, is converted in the level converter 404 to a level corresponding to redial memory 401 energized by the battery voltage $V_M$ and is then given to the redial memory 401.

In the key input circuit 412 to which the key input signal $K_i$ has been given, a key-in signal $K_j$ indicating the arrival of the key input signal $K_i$ is obtained. According to this key-in signal $K_j$, key control signals $KC_1$, $KC_2$ can be obtained from the system control circuit 414. The key control signal $KC_1$, obtained from the system control circuit 414 energized by the supply voltage $V_{DD}$ due to the telephone circuit line voltage $V_L$, is converted to a level corresponding to the redial memory 401 via the level converter 406 and is then given to the redial memory 401. In the redial memory 401 controlled in the status of data writing, based on this key control signal $KC_1$, dial data to be given via the level converter 404 are stored in the order of dial inputs.

If the mode input MODEIN preset in the system control circuit 414 is a DTMF mode, the DTMF output circuit 422 is rendered operative due to the output control of the output control circuit 420 by the control output from the system control circuit 414. If the mode input MODEIN is a pulse mode, the pulse output circuit 424 is rendered operative due to the output control of the output control circuit 420 due to the control output from the system control circuit 414. Thus a DTMF output signal (DTMFOUT) or a pulse output signal (DP) is outputted, as a selection signal, depending on the mode input. In the pulse mode, a pulse selection signal 20P/10P is given to the pulse output circuit 424, and so the pulse output circuit 424 sends out to a telephone on the other end of the line a pulse output signal (DP) 20PPS (pulse per second) or 10PPS, whichever matching that telephone. The output control circuit 420 also outputs a mode output MODEOUT indicating the DTMF mode or the pulse mode, and during the sending of a dialer output signal, a mute signal MUTE.

In the repertory memory 402, abbreviated or clipped dial data from the redial memory 401 are stored via a key input signal $K_i$ from the keyboard 2. For reading the clipped dial data, an abbreviated dial number combined of a memory key M and figure keys "1" and/or "0" of the keyboard 2 is inputted, whereupon a key input signal $K_i$ representing the abbreviated dial number is given to the key input circuit 412. Like the key control signal $KC_1$, a key control signal $KC_2$, to be outputted from the system control circuit 414 based on the key input signal $K_i$ given to the key input circuit 412, is converted at the level converter 410 to a level matching the repertory memory 402 energized by the supply voltage $V_M$ and is then given to the repertory memory 402. Thus the repertory memory 402 has been set in the read mode. Consequently a non-clipped formal dial data corresponding to the abbreviated dial number is read out from the repertory memory 402 to the redial memory 401. After having been level-converted by the level converter 408, the dial data stored in the redial memory 401 are given to the output control circuit 420, the DTMF output circuit 422 and the pulse output circuit 424, whereupon the dial data, like the dial output, are outputted as a selection signal.

The dial data (from the keyboard 2 stored in the redial memory 401 and the dial data read out from the repertory memory 402 are the data just newly stored and can be sent out by depressing a redial key R on the keyboard 2.

Figure 2:
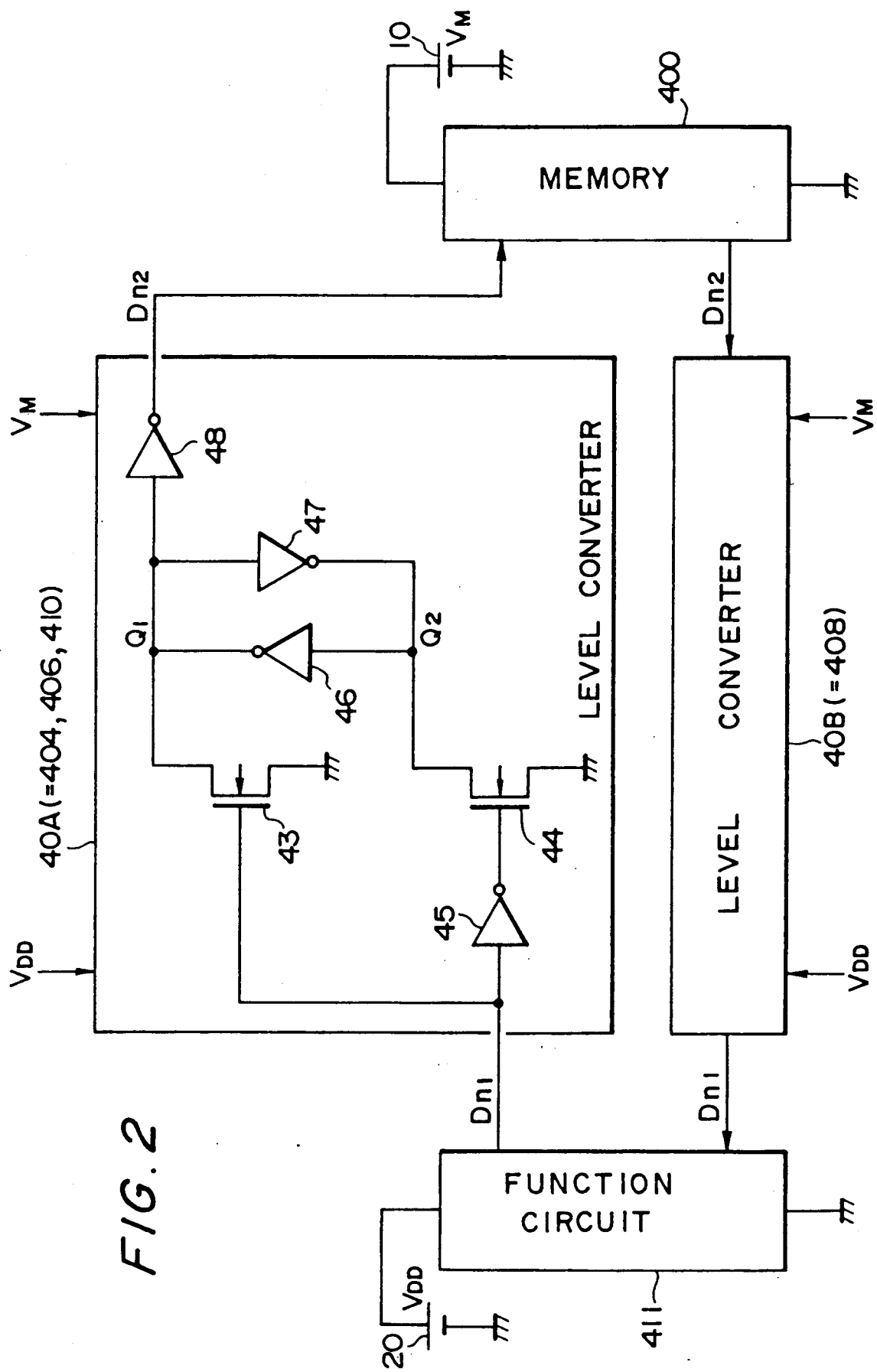
FIG. 2 is a circuit diagram showing a practical level converter in the dialer circuit of FIG. 1.

FIG. 2 illustrates the circuit structures of the level converters 404, 406, 408, 410 in the dialer circuit of FIG. 1.

In FIG. 2, a memory 400 represents the redial memory 401 and the repertory memory 402 which are to be energized by the battery 10 of the supply voltage $V_M$. And a function circuit 411 represents the key input circuit 412, the output control circuit 420, etc. which are to be energized by the supply voltage $V_{DD}$ set by the circuit voltage $V_L$ via the telephone circuit line, etc.

Therefore a level converter 40A corresponds to the level converters 404, 406, 410 in the illustrated embodiment; a level conversion is taken effect with respect to a signal inputted to the memory 400 (to be energized by the battery voltage $V_M$) from the function circuit 411 (to be energized by the supply voltage $V_{DD}$).

A level converter 40B corresponds to the level converter 408 in the illustrated embodiment; a level conversion is taken effect with respect to a signal outputted from the memory 400 (to be energized by the battery voltage $V_M$) to the function circuit 411 (to be energized by the supply voltage $V_{DD}$).

The level converters 40A, 40B are identical in interior circuit with each other and are different from each other only in the direction of transfer of signal between the memory 400 and the function circuit 411. Specifically, in the level converter 40A, two n-channel enhancement-mode MOSFETs (hereinafter called "FET") 43, 44 are located at the signal input port so that a signal $D_{n1}$ representing data, to be given to the memory 400 from the function circuit 411, is given directly to the gate of the FET 43 and so that the signal $D_{n1}$ is given to the gate of the FET 44 after having been inverted by an inverter 45. Between the drains of the FETs 43, 44, a pair of inverters 46, 47 forming a one-way closed loop is connected. Located at the signal output port is an inverter 48 from which a signal $D_{n2}$ can be obtained as a level conversion output. This signal $D_{n2}$ represents the data to be sent to the memory 400 from the function circuit 411 and has been converted to a proper level matching the memory 400.

Meanwhile, in the level converter 40B, the signal $D_{n2}$ representing the data read out from the memory 400 is converted into the signal $D_{n1}$ having a proper level on the side of the function circuit 411 and is then given to the function circuit 411.

Given that a level conversion corresponding to the difference of these two voltages $V_{DD}$, $V_M$ is taken effect, it is possible to perform the transfer of necessary data as well as the operation control, thus preventing any misoperation due to the difference of the voltages $V_{DD}$, $V_M$. Therefore it is possible to eliminate the inconveniences resulting from energizing the memory 400 by the separate battery 10 independently of the power source 20 for the function circuit 411.

Figure 3:
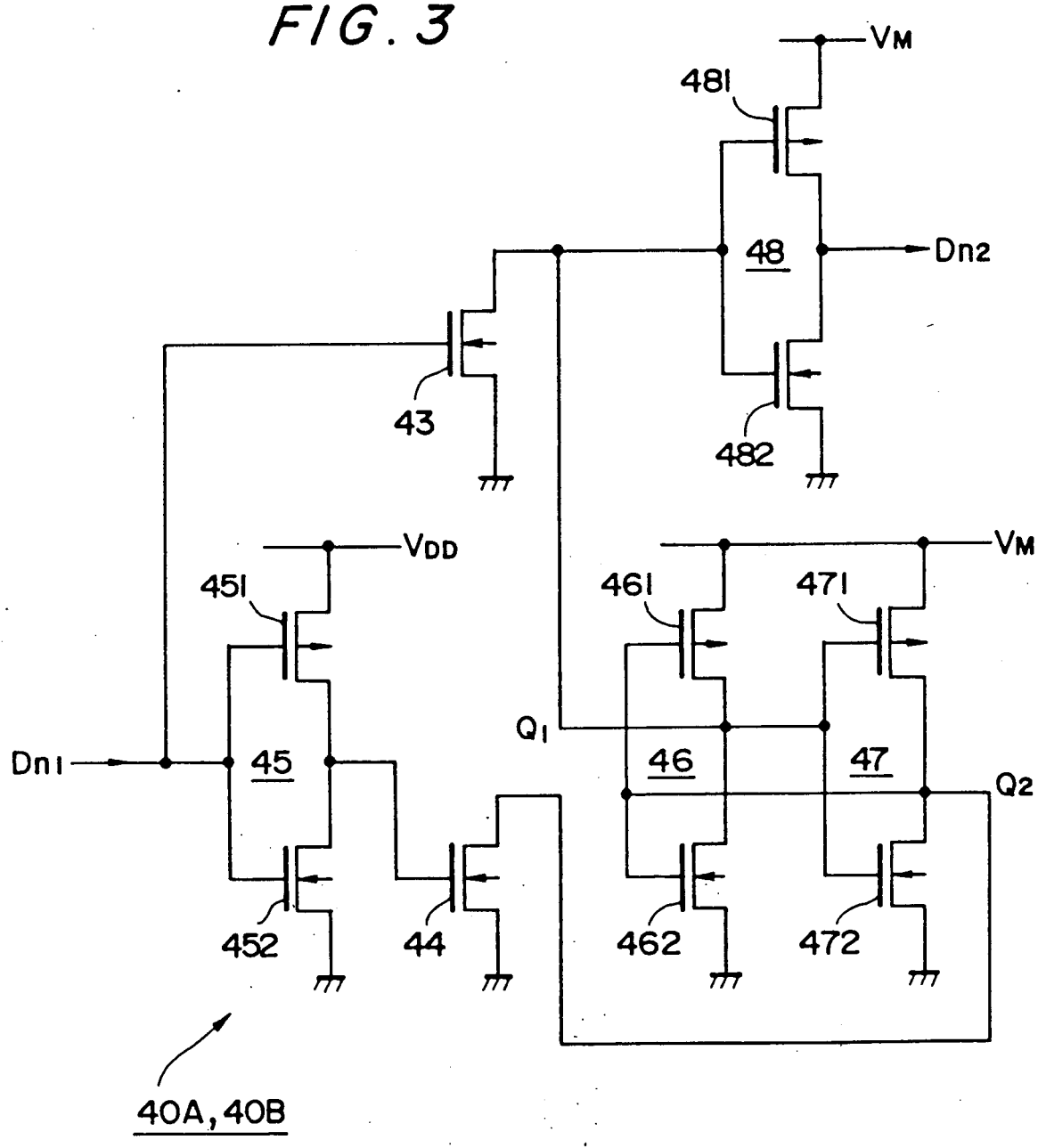
FIG. 3 is a detail circuit diagram of the level converter of FIG. 2.

FIG. 3 illustrates the detail circuit structures of the level converters 40A, 40B of FIG. 2.

The inverter 45 located at the gate input port of the FET 44 is composed of a p-channel enhancement-mode FET 451 and an n-channel enhancement-mode FET 452. In this inverter 45, the supply voltage $V_{DD}$ is impressed to the drain of the FET 451, in response to which a switching operation on the basis of the supply voltage $V_{DD}$ is taken effect in correspondence with the function circuit 411 to be energized by the supply voltage $V_{DD}$.

The inverters 46, 47 forming a closed loop is composed of a p-channel enhancement-mode FET 461, an n-channel enhancement-mode FET 462, a p-channel enhancement-mode FET 471 and an n-channel enhancement- FET 472. The inverter 48 located at the signal output port is composed of a p-channel enhancement-mode FET 481 and an n-channel enhancement-mode FET 482. In these inverters 46, 47, 48, the supply voltage $V_M$ is impressed to the respective drains of the FETs 461, 471, 481, in response to which a switching operation on the basis of the supply voltage $V_M$ is taken effect in correspondence with the memory 400 to be energized by the supply voltage $V_M$.

Figure 4:
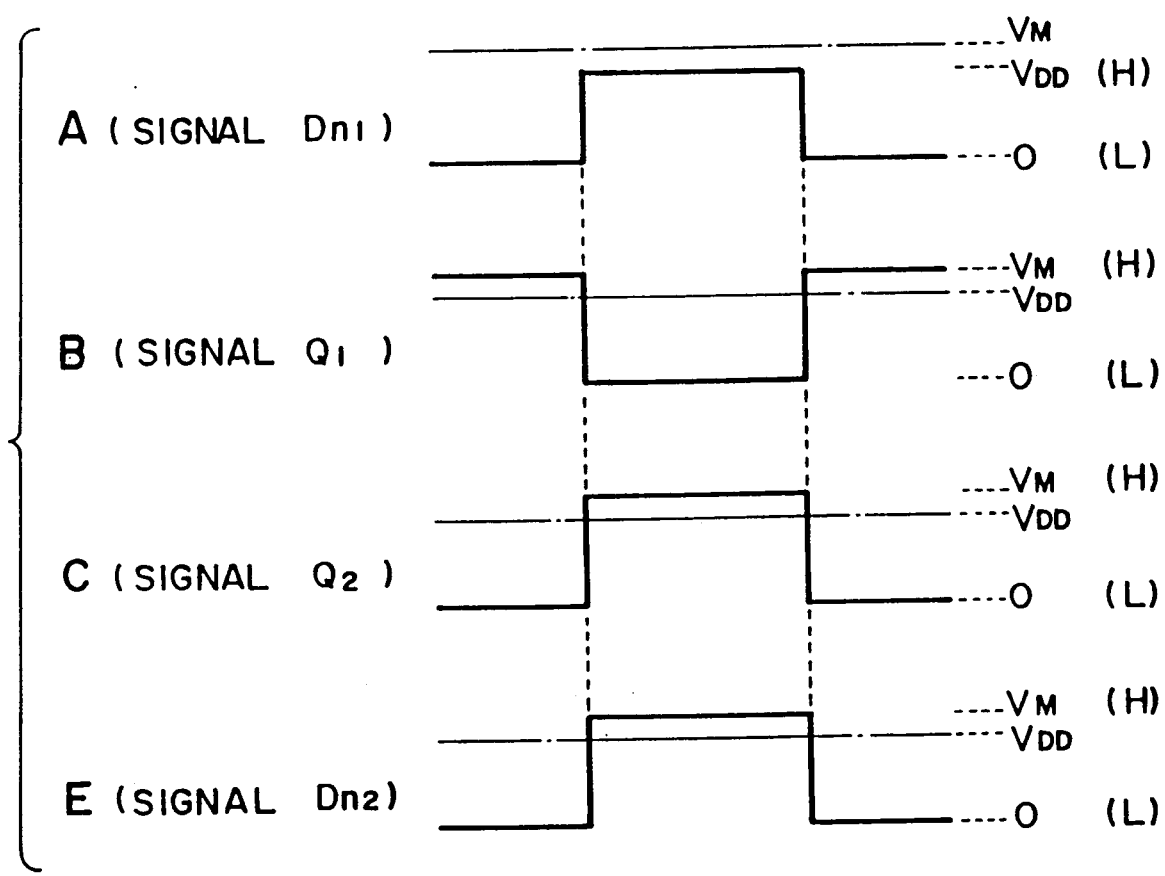
FIGS. 4A, 4B, 4C, 4E, 5F, 5G and 5I show wave forms of various signals, illustrating the operation of the level converter of FIG. 3.

In these level converters 40A, 40B, assuming that the voltages $V_{DD}$, $V_M$ are in the relation of $V_M > V_{DD}$, if a signal $D_{n1}$ of FIG. 4A is given, the FET 43 and the inverter 45 take a switching operation by this signal $D_{n1}$ so that a signal $Q_1$ of FIG. 4B is obtained at the drain side of the FET 43, and a signal $Q_2$ of FIG. 4C is obtained at the drain side of the FET 44. With the signal $D_{n1}$, because the function circuit 411 is energized by the supply voltage $V_{DD}$, a high (H) level is the supply voltage $V_{DD}$. To the contrary, with the signals $Q_1$, $Q_2$, because the battery voltage $V_M$ is impressed to the drains of the FETs 43, 44, and H level is the battery voltage $V_M$; that is, a level conversion has been taken effect. By these signals $Q_1$, $Q_2$ obtained at the input and output sides of the inverters 46, 47, a signal $D_{n2}$ can be obtained at the output side of the inverter 48. This signal $D_{n2}$ is outputted with its H level converted tot eh battery voltage $V_M$ corresponding to the memory 400 energized by the battery voltage $V_M$, as shown in FIG. 4E.

Figure 5:
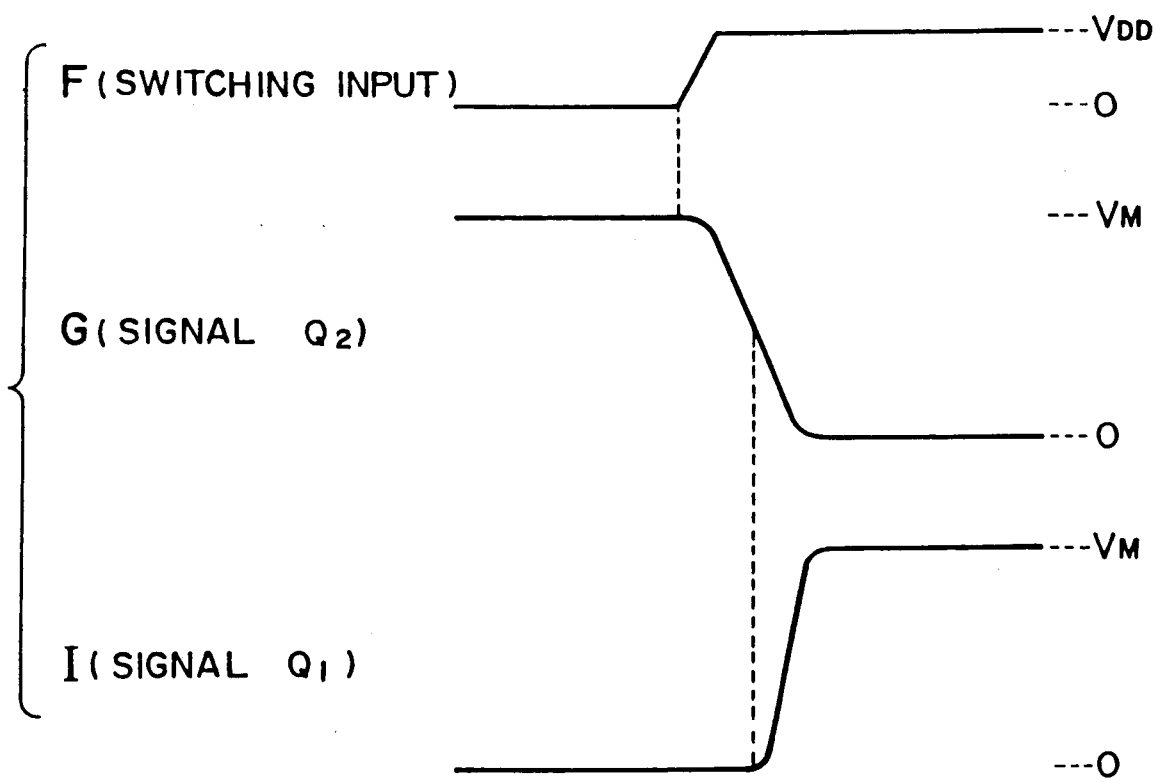
Figure 6:
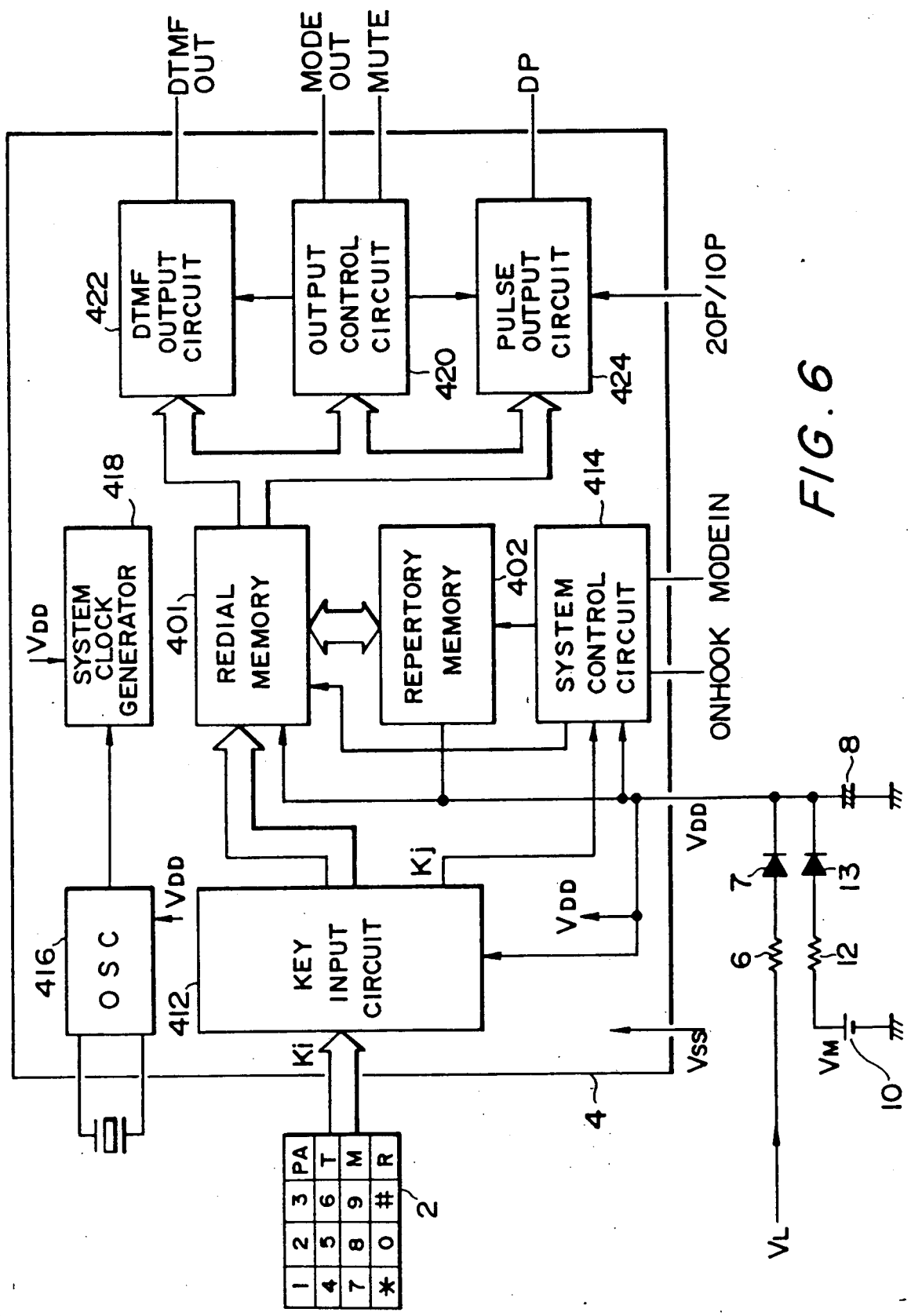
FIG. 6 is a block diagram similar to FIG. 1, but showing a conventional dialer circuit.
Figure 7:
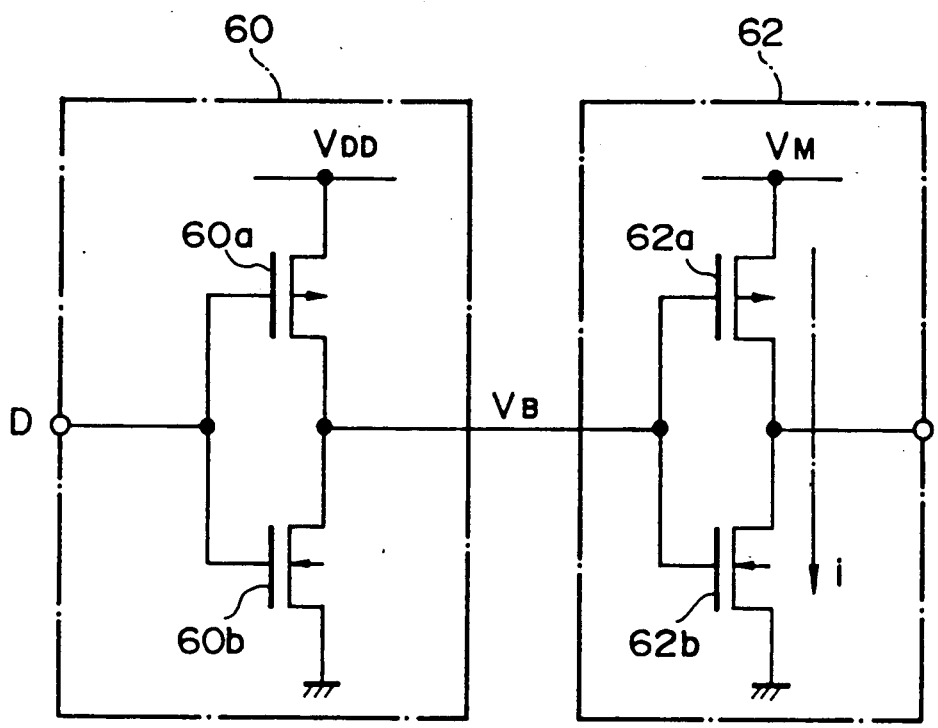
FIG. 7 is a circuit diagram showing the connection between a dialer function circuit and a memory circuit in the conventional dialer circuit.
Figure 8:
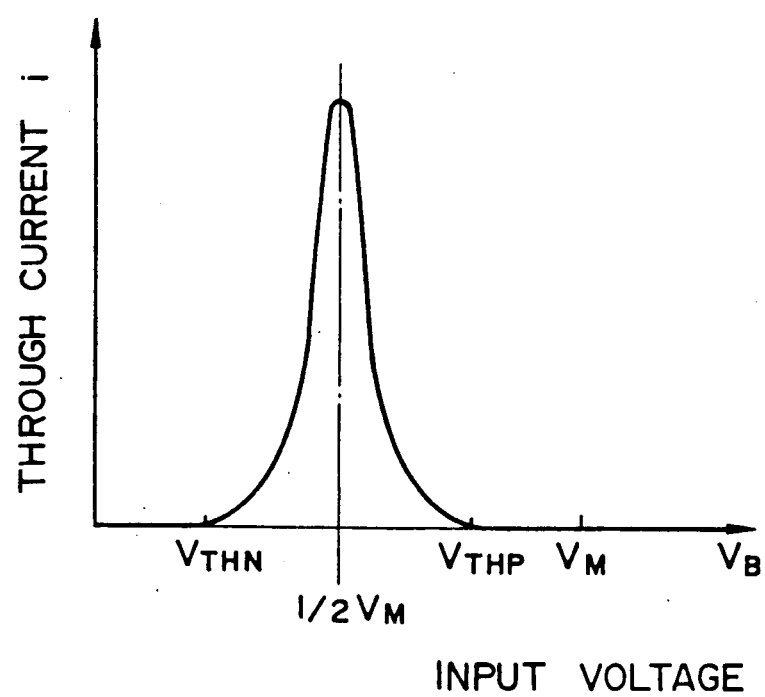
FIG. 8 is a characteric graph of a through current in the conventional dialer circuit.

The level converting operation will now be described with reference to FIG. 5 illustrating the switching action of the inverters 46, 47. As shown in FIG. 5F, when the drain of the FET 43 and the drain of the FET 44 are shifted to the high (H) level and the low (L) level, respectively, by the switching input, the signal $Q_2$ shifting from "H" level to "L" level is created in the output of the inverter 47, as shown in FIG. 5G, and the signal $Q_1$ shifting from "L" level to "H" level is created in the output of the inverter 46, as shown in FIG. 5I. The level change of each of the signals $Q_1$, $Q_2$ depends on the battery voltage $V_M$ impressed to the drain of a respective one of the FETs 461, 471. Consequently it is noted that a signal $D_{n2}$, as the switching output level-converted by a predetermined switching input can be obtained.

With the dialer circuit of this invention, partly since the respective power source systems for the memory and the other function circuits are separate from and independent of each other, and partly since an operating current with respect to the other function circuits is prevented with from flowing from a battery connected to the memory, it is possible to avoid any wasteful consumption of the battery energizing the memory, thus guaranteeing an elongated span of life of the battery.

Further, because a level conversion means is located, on the signal line between the memory and the other function circuit, for compensating the difference of the supply voltages to conduct the transfer of data between the memory nd the other function circuit which are different in supply voltage from each other, a conversion can be made to a level corresponding to a respective one of the supply voltages to enable the transfer of data, irrespective of the difference of the supply voltages, thus avoiding any misoperation due to the difference in supply voltages.

What is claimed is:

1. A dialer circuit for sending out a predetermined dialer signal to a telephone circuit line based on a key input signal, comprising:
   (a) a plurality of dialer function circuits for giving a predetermined conversion to the key input signal and for outputting the resulting key input signal, as a dialer signal in the form of either a DTMF signal or a pulse signal, to the telephone circuit line;
   (b) a dialer memory for storing therein the dialer signal so that the stored dialer signal may be optionally read by said dialer function circuits;
   (c) a line power source circuit for supplying a line voltage of the telephone circuit line, as a supply voltage, to said dialer function circuits;
   (d) a memory back-up battery separate from and independent of said line power source circuit for supplying a battery voltage to said dialer memory; and
   (e) a voltage level converter circuit located between said dialer memory and each of said dialer function circuits for matching a differential voltage level between said memory back-up battery and said line power source circuit.

2. A dialer circuit according to claim 1, wherein said dialer function circuits include:
   a key input circuit for receiving the key input signal;
   a system control circuit for controlling the conversion of the key input signal;
   a DTMF output circuit for sending out the dialer signal, as a DTMF signal, to the telephone circuit line;
   a pulse output circuit for sending out the dialer signal, as a pulse signal, to the telephone circuit line; and
   an output control circuit for controlling a shift between said DTMF output circuit and said pulse output circuit; and wherein said dialer circuit further includes a plurality of voltage level converter circuits a first level converter circuit located between said dialer memory and said key input circuit, a second level converter circuit between said dialer memory and said system control circuit, and a third level converter circuit between said dialer memory and said DTMF output circuit, said pulse output circuit and said output control circuit.

3. A dialer circuit according to claim 2, wherein said dialer function circuits, said dialer memory and said voltage level converter circuits are formed on a single-chip IC.

4. A dialer circuit according to claim 1, wherein said dialer memory includes
   a redial memory for storing therein the dialer signal, and
   a repertory memory for storing therein the dialer signal as a string of abbreviated dial data, and wherein said dialer circuit further includes a plurality of voltage level converter circuits located one between each of said redial and repertory memories and each of said dialer function circuits.

5. A dialer circuit according to claim 4, wherein said memories, said dialer function circuits, and said voltage level converter circuits are formed on a single-chip IC.

6. A dialer circuit according to claim 1, wherein said line power source circuit is adapted to supply the line voltage to each said dialer function circuit via a filter, and said memory back-up battery is adapted to supply the battery voltage to each said memory of said dialer memory independently of said line power source circuit.

7. A dialer circuit according to claim 1, wherein said voltage level converter circuit includes:
   a first FET adapted to receive at its gate a supply of an input signal from each said dialer function circuit or said dialer memory;
   an input-side inverter for inverting the input signal;
   a second FET adapted to receive at its gate a supply of an output of said input-side inverter;
   an inverter loop connected between respective drains of said first and second FETs and forming a one-way closed loop; and
   an output-side inverter connected to the drain of said first FET for supplying a level-converted output signal to said dialer memory or said dialer function circuits.

8. A dialer circuit according to claim 7, wherein one of the line voltage and the battery voltage is supplied to said input-side inverter, while the other voltage is supplied to said output-side inverter.

9. A dialer circuit according to claim 8, wherein the same supply voltage is supplied to said output-side inverter and said inverter loop.

10. A dialer circuit according to claim 7, wherein said first and second FETs are enhancement-mode MOSFETs formed on a single-chip IC.

11. A dialer circuit according to claim 7, wherein each of said input-side and output-side inverters is composed of a pair of opposite-polarity enhancement-mode MOSFETs interconnected in series, said inverter loop being composed of two pairs of opposite-polarity enhancement-mode MOSFETs interconnected in series, all of said MOSFETs being formed on a single-chip IC.

* * * * *